(12) United States Patent
Ryan et al.

(10) Patent No.: US 8,829,443 B2
(45) Date of Patent: Sep. 9, 2014

(54) NEUTRON AND GAMMA-RAY DETECTION SYSTEM

(75) Inventors: James M. Ryan, Lee, NH (US); John R. Macri, Durham, NH (US); Mark L. McConnell, Newmarket, NH (US); Ulisse Bravar, Belmont, MA (US)

(73) Assignee: University of New Hampshire, Durham, NH (US)

( * ) Notice: Subject to any disclaimer, the term of this patent is extended or adjusted under 35 U.S.C. 154(b) by 71 days.

(21) Appl. No.: 12/313,237

(22) Filed: Nov. 18, 2008

(65) Prior Publication Data
US 2009/0250620 A1 Oct. 8, 2009

Related U.S. Application Data

(63) Continuation-in-part of application No. 11/513,944, filed on Aug. 31, 2006, now abandoned.

(60) Provisional application No. 60/713,104, filed on Aug. 31, 2005.

(51) Int. Cl.
| | |
|---|---|
| *G01T 1/20* | (2006.01) |
| *G01T 3/06* | (2006.01) |
| *G01T 3/00* | (2006.01) |
| *G01T 1/29* | (2006.01) |

(52) U.S. Cl.
CPC ............. *G01T 3/06* (2013.01); *G01T 1/2907* (2013.01); *G01T 1/20* (2013.01)
USPC ............. 250/361 R; 250/362; 250/390.11; 250/390.12

(58) Field of Classification Search
USPC ............ 250/390.1, 390.11, 391.12, 392, 362
See application file for complete search history.

(56) References Cited

U.S. PATENT DOCUMENTS

| | | | |
|---|---|---|---|
| 4,638,164 A | 1/1987 | Sonne | |
| 4,870,669 A * | 9/1989 | Anghaie et al. | 378/87 |
| 5,345,084 A | 9/1994 | Byrd | |
| 6,580,079 B1 | 6/2003 | Craig | |
| 2004/0238751 A1 | 12/2004 | Penn | |
| 2004/0262530 A1 * | 12/2004 | Reber et al. | 250/395 |
| 2010/0025592 A1 * | 2/2010 | Tumer | 250/370.08 |
| 2010/0038550 A1 * | 2/2010 | Devito | 250/370.11 |

* cited by examiner

*Primary Examiner* — David Porta
*Assistant Examiner* — Carolyn Igyarto
(74) *Attorney, Agent, or Firm* — Devine, Millimet & Branch; Paul C. Remus; Kimberly A. W. Peaslee

(57) ABSTRACT

The present invention is a radially symmetric imaging detector that measures an incident neutron's or gamma-ray's energy and identifies its source on an event-by-event basis.

8 Claims, 5 Drawing Sheets

US 8,829,443 B2

NEUTRON AND GAMMA-RAY DETECTION SYSTEM

CROSS-REFERENCE TO RELATED APPLICATIONS

This application is a continuation-in-part of application Ser. No. 11/513,944, filed Aug. 31, 2006, which claims the benefit of U.S. Provisional Application No. 60/713,104, filed Aug. 31, 2005.

GOVERNMENT SPONSORSHIP

The U.S. Government has a paid-up license in this invention and the right in limited circumstances to require the patent owner to license others on reasonable terms as provided for by the terms of Contract No. DE-FG52-04NA25687 awarded by the DoE of the U.S. Government and under Contract No. NAG5-13519 awarded by NASA of the U.S. Government.

TECHNICAL FIELD

The present invention relates to a system for neutron and gamma-ray detection. More specifically, it relates to a radially symmetric imaging detector that directly measures the incident radiation.

BACKGROUND INFORMATION

Because they are electrically neutral, neutrons and gamma-rays have been traditionally detected using indirect means. However, typical indirect techniques of the prior art, for neutrons, for example, while able to measure count rate, provide little, if any, information on the neutron's energy or the location of the neutron's source. This lack of information limits the usefulness of prior art detectors in a number of applications, including the detection of special nuclear material (SNM). These materials—specifically uranium and transuranics—emit neutrons via spontaneous or induced fission, which neutron emissions are unique to fissionable material.

While position sensitive neutron detectors have been described in the prior art, such as the COMPTEL as described in J. Ryan, et al., "COMPTEL as a Solar Gamma-Ray and Neutron Detector," presented at Data Analysis in Astronomy; 1992, the active areas of these prior art detectors were typically a flat surface, with a limited field of view. The radial symmetry of the detection of the present invention is a desirable feature in several applications. In space-based orthogonal to the direction to the Sun. Therefore, a flat-surface detector has a time-dependent sensitivity to solar events, which is undesirable when detecting time-varying neutron or gamma-ray fluxes, such as the ones from solar flares. In another important application, the search for SNM emitting neutrons, a radially symmetric detector placed in any area (e.g. a storage warehouse or loading dock) provides a complete 360° wide scan with no need to change its orientation.

A cylindrically symmetric imaging neutron detector described in the prior art is described in U.S. Pat. No. 5,345,084. However, the detector therein is based on count rate rather than measurement of individual neutrons and, as a result, provides no information on neutron energy and no means to identify gamma-rays. With respect to the coordinate system in FIG. 1, the detector of the prior art can determine the azimuthal angle $\phi$ of the neutron source (with relatively poor accuracy, $\Delta\phi \sim 30°\text{-}45°$), but is unable to measure the zenith angle $\theta$, making it impossible to locate point sources.

SUMMARY OF THE INVENTION

The present invention is a system comprising a radially symmetric imaging detector that directly measures an incident neutron's or gamma-ray's energy and identifies the point source of the neutron or gamma-ray on an event-by-event basis through an event circle analysis.

BRIEF DESCRIPTION OF THE DRAWINGS

These and other features and advantages of the present invention will be better understood by reading the following detailed description, taken together with the drawings wherein.

DETAILED DESCRIPTION OF THE INVENTION

The present invention relates to a radially symmetric imaging detection system for neutrons or gamma-rays.

With respect to neutrons, the present invention measures the energy of an incident neutron, and through scattering kinematics determines the point or extended sources of the neutron. This technique is based on a known detection mechanism—fast neutron scattering off ambient hydrogen (n-p scattering). Such a detection system is configured to locate n-p scatter sites within its volume using the scintillation light generated by recoil protons, highly ionizing particles. For the neutrons that undergo at least two successive n-p scatters, an image revealing the location of a source can be constructed.

Figure 1:
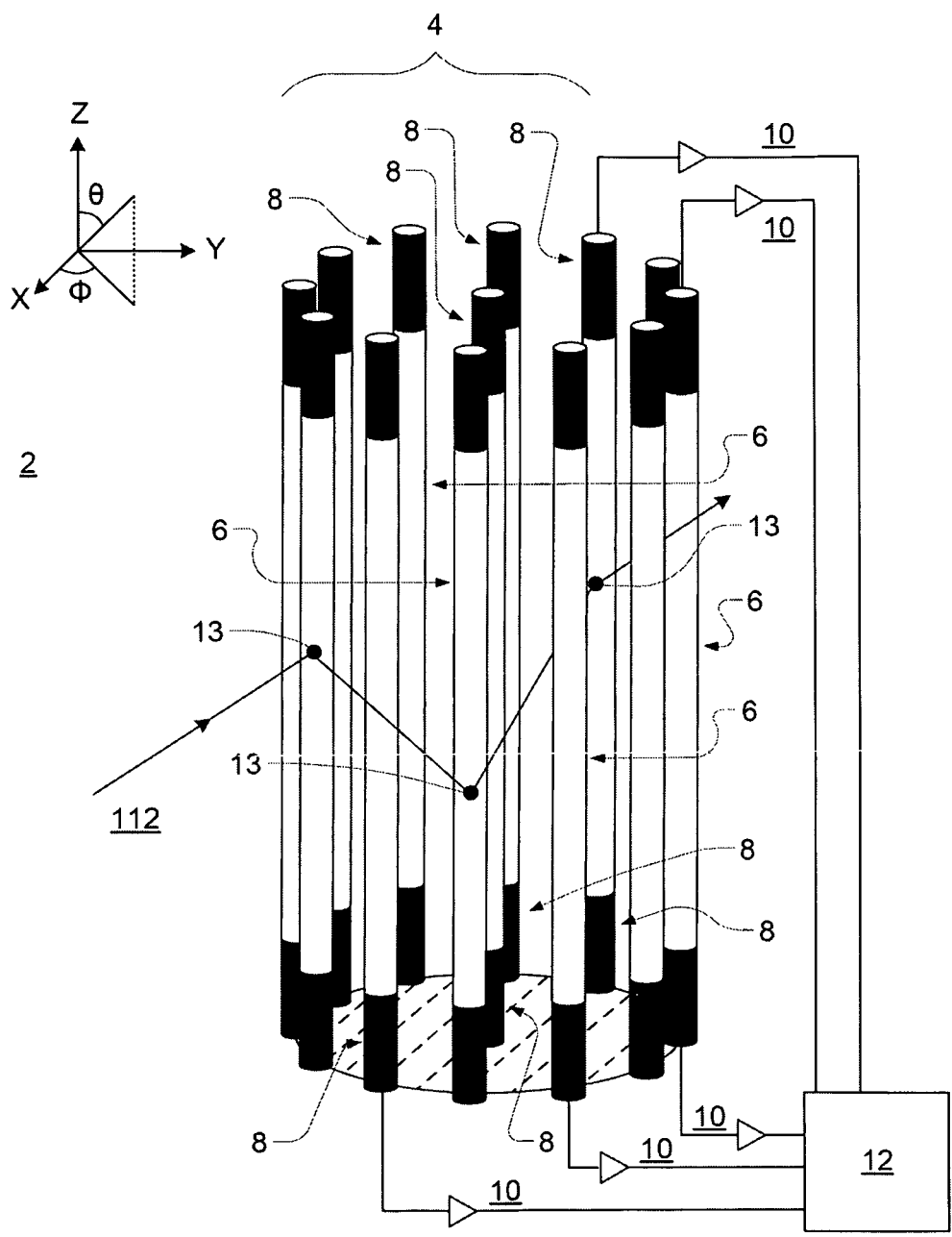
FIG. 1 is a schematic diagram of one preferred embodiment of the present invention.
Figure 2:
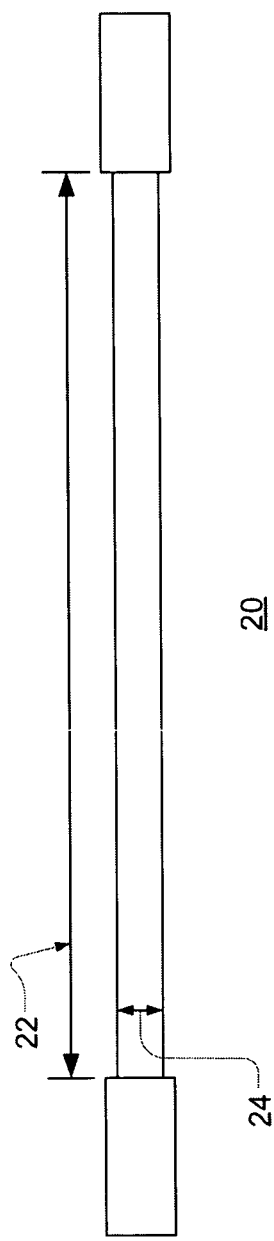
FIG. 2 is a side view of one of the plastic scintillator bars used in the preferred embodiment of the present invention shown in FIG. 1.
Figure 4:
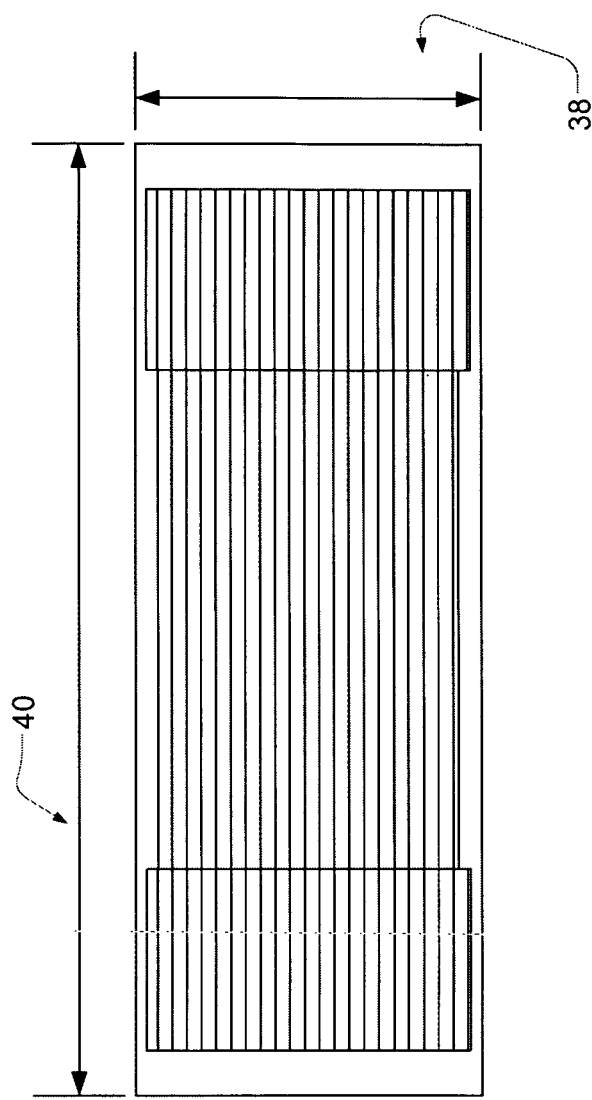
FIG. 4 is a side view of the preferred embodiment of the present invention shown in FIG. 3.
Figure 3:
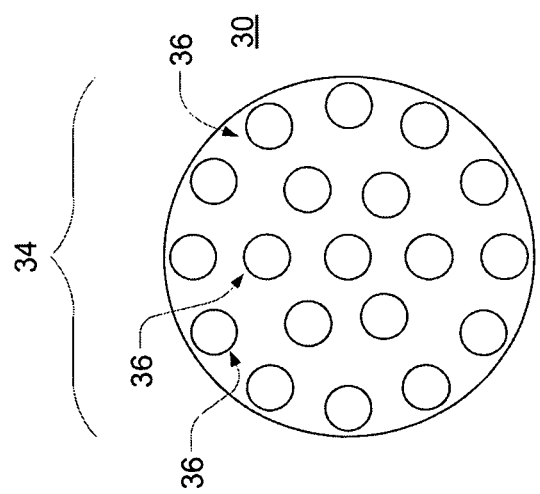
FIG. 3 is an end view of one preferred embodiment of the present invention.

FIG. 1 shows one preferred embodiment of the imaging detection system 2 of the present invention. The design consists of a radially symmetric array 4 of multiple (in this embodiment 13) parallel scintillator bars 6. The scintillator bars 6 are preferably organic scintillator bars, either plastic or liquid, selected for their relative abundance of protons. The dimensions of each scintillator bar 6 used in a particular embodiment may vary, from case to case, depending on the desired application. For example, as shown in FIG. 2, typical values for a plastic scintillator bar 20 are 30.0 cm length 22 and 1.5 cm diameter 24. The total number of the scintillator bars and the requisite cylindrical symmetric array of the bars may also vary, from embodiment to embodiment, depending on the desired application, as is discussed in more detail below. For example, as shown in FIG. 3, the detection system 30 comprises a cylindrical symmetric array 34 of 19 scintillator bars 36 in which each scintillator bar has a diameter of 1.5 cm and a length of 30 cm. As shown in FIG. 4, this detection system 30 has resulting overall dimensions of 11.5 cm diameter 38 and 51.0 cm length 40.

Figure 6:
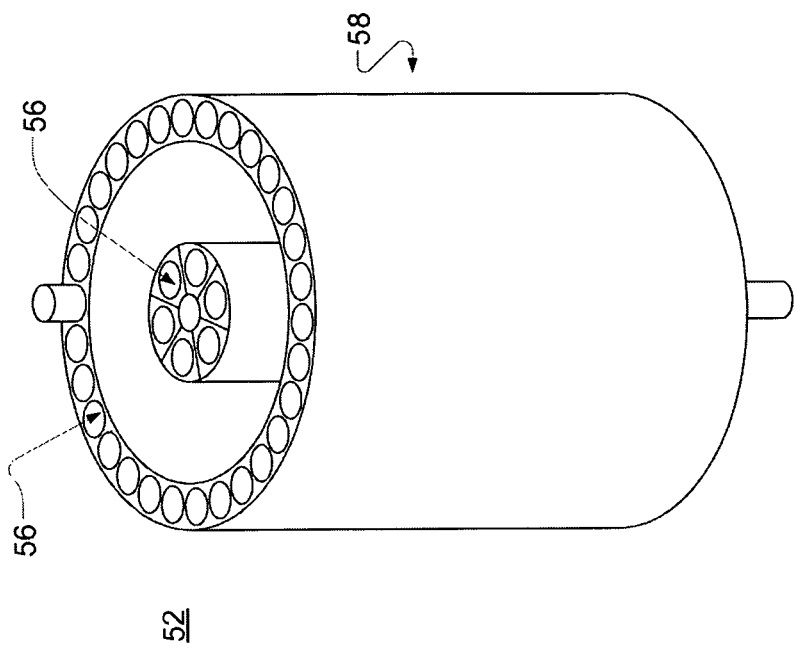
FIG. 6 is a side view of the preferred embodiment of the present invention shown in FIG. 5.
Figure 5:
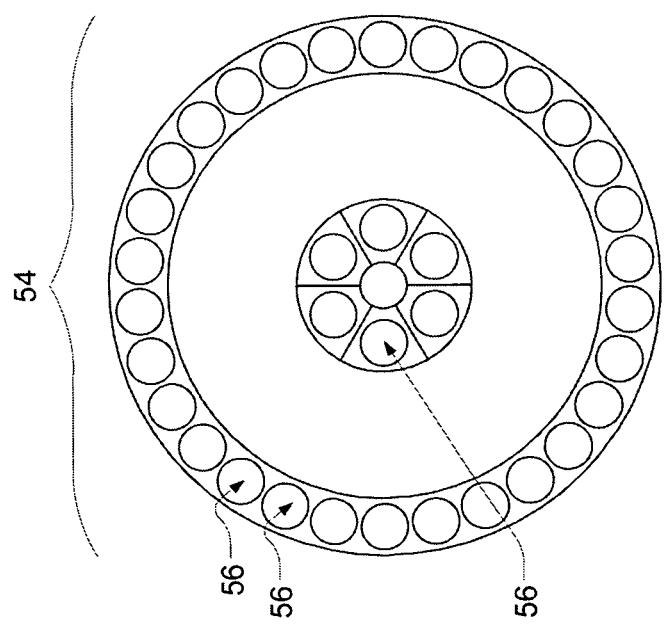
FIG. 5 is a top view of one preferred embodiment of the present invention.

It is to be understood that the term "scintillator bar," as used herein, includes optically separated chambers, filled with scintillation material, in a unitary housing. Thus, FIGS. 5 and 6 show a preferred embodiment of the imaging detection system 52 present invention in which the design consists of a radially symmetric array 54 of multiple (in this case 37) scintillator bars, or chambers 56, in a liquid scintillator tank 58 divided by baffles into optically separated chambers 56.

Referring again to the preferred embodiment of FIG. 1, a photomultiplier tube (PMT) 8, or other light sensing device, known to those skilled in the art, is connected to the first and the second end of each scintillator bar 6. Each PMT 8 is, in turn, connected 10 to signal processing electronics 12, to which it sends light-sensing signals, consisting of pulse processing electronics known to those skilled in the art. Fast discriminators and coincidence circuits are employed to initiate the measurement of the required parameters for each incident particle registering two or more interactions. The required parameters, interaction locations, energies, relative times and pulse shapes are digitized and registered as a series of detector IDs, pulse heights, and times of flight for each detected particle.

A data acquisition system records these parameters for each detected particle for subsequent imaging and energy analysis.

Referring still to FIG. 1, the technique for detecting a neutron 11 impinging the detection system 2 is based on the measurement of the energies, positions, sequence and relative times of interaction of recoil protons resulting from multiple, successive, neutron-proton) (n-p) scatters 13 and on the kinematics of n-p scattering for reconstruction of the incident neutron energy and direction. In the case of gamma-rays, the same technique applies, but Compton-scatter electrons are used instead of protons. With respect to neutrons, scintillator bar 6 material and diameter are chosen to maximize the probability of single n-p scatters occurring within one scintillator bar 6, with the scattered charged particle being fully contained within the boundaries of the scintillator bar 6. At the same time, the scintillator bars 6 should be sufficiently thin for a scattered neutron to exit the bar after the first n-p scatter 13 and to produce successive n-p scatters 13 in other scintillator bars 6.

Energy information on a recoil proton, or Compton electron in the case of gamma-rays, resulting from an elastic n-p scatter in a given scintillator bar 6, is obtained from the amplitude of the signals measured by the PMTs 8 at the first and second ends of the scintillator bar 6. Position information on the proton in the x-y plane is determined from the position in the x-y plane of the scintillator bar 6 in which the interaction occurs. Position information on the proton along the z-axis is measured by analyzing the arrival time differences and/or the amplitude differences of signals measure by PMTs 8 at the ends of the scintillator 6 in which the interaction occurs. The signals measured by the PMTs at the ends of the scintillator bars 6 in which successive n-p scatters occur also provide a measure of the relative times of the successive scatters.

Figure 7:
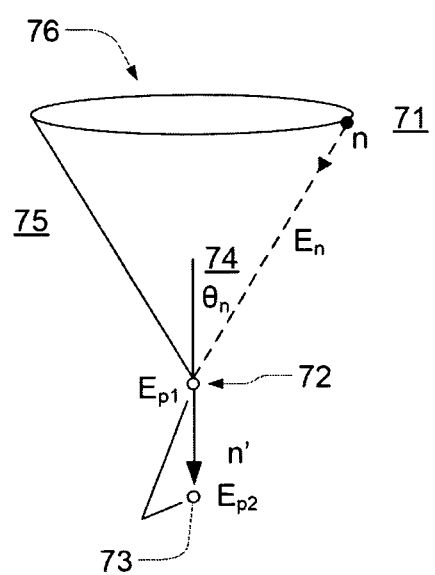
FIG. 7 is a schematic diagram of a double n-p scatter events detected by a preferred embodiment of the present invention.

Referring to FIG. 7, a neutron 71, whose incident direction is unknown, undergoes at least two n-p scatters 72, 73. By measuring the coordinates of the two interactions, the relative times of the two interactions and the energy of the recoil proton of the first interaction, one can determine the energy and direction (i.e. vector velocity) of this particle. The neutron scatter angle, shown as $\theta_n$, 74 is given by:

$$\sin^2\theta_n = \frac{E_{p1}}{E_n}$$

where $E_{p1}$ and $E_n$ are the energies of the first recoil proton and the incident neutron, respectively. Once $E_{p1}$ and $E_n$ are known, one can determine $\theta_n$.

However, measurement of the sequence, energies and positions of the protons resulting from two successive n-p scatters of an incident neutron is not sufficient to localize an unknown source of neutrons. One more piece of information is needed, the energy of the incident neutron, En. In the present invention, the energy of the incident neutron is determined by measuring the time difference between the two successive n-p scatters 72, 73. This time difference provides the velocity and thus the energy of the neutron scattered after the first recoil. The incident neutron energy, $E_n$, is the sum of this scattered neutron's energy and the energy of the first scattered proton, $E_{p1}$. In addition, this time difference allows for the separation of 1-100 MeV neutrons from gamma-rays.

FIG. 7 shows a schematic diagram of the basic kinematics of event reconstruction for two successive n-p scatter events 72, 73 caused by a neutron 71. Again, $.\theta_n$ 74 the neutron scatter angle is given by $$\sin^2\theta_n = \frac{E_{p1}}{E_n}$$

where $E_{p1}$ and $E_n$ are the energy of the first recoil proton and the incident neutron, respectively. Hard-sphere scattering implies that the scattered neutron and proton momenta will lie at right angles to one another and that the incident neutron direction must lie on a cone 75 about the recoil neutron velocity vector. The projection of this cone on the image plane or the celestial sphere is an event circle 76. The superposition of event circles from many incident neutrons provides the statistical information necessary to locate an unknown source of neutrons, event circles from a point source intersect, but unrelated, for example background event circles, do not. This procedure has been demonstrated successfully on the COMPTEL experiment by imaging MeV gamma-ray and neutron sources.

If certain liquid scintillator materials are used instead of plastic scintillator materials, pulse shape discrimination (PSD) techniques can be employed to further discriminate neutron form gamma-ray interactions.

Finally, by preferably augmenting the structure of the detection system of the present invention with an anticoincidence shield, unrelated charged particles can be excluded.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of locating and identifying a source of incident neutrons comprising:
   positioning multiple scintillator bars, each with a first end and a second end, so that such bars are substantially parallel wherein such bars are radially symmetric and all of the scintillator bars have the same diameter;
attaching a light sensing means to the first end and to the second end of each such bar;
detecting, for each of a series of incident neutrons, that a given incident neutron produced a first n-p scatter in a first such bar;
detecting, for the series of incident neutrons that the given incident neutron produced a second n-p scatter in a second such bar, wherein the first n-p scatter occurs prior to the second n-p scatter;
measuring the positions and relative times of the first n-p scatter and the second n-p scatter;
measuring the energy of a recoil proton produced by the first n-p scatter;
calculating an event circle for the given incident neutron thereby locating and identifying a source of incident neutrons.

2. The method of locating and identifying a source of incident neutrons of claim 1, further comprising the step of identifying through scattering kinematics the source as a point source of incident neutrons.

3. A method of locating and identifying a source of incident neutrons comprising:
providing a detector, the detector comprising multiple scintillator bars, each with a first end and a second end, so that such bars are substantially parallel wherein such bars are radially symmetric and all of the scintillator bars have the same diameter;
measuring, for each of a series of incident neutrons, the energy of a given incident neutron;
detecting that the given incident neutron produced a first n-p scatter in a first bar and a second n-p scatter in a second bar, wherein the first n-p scatter occurs prior to the second n-p scatter;
measuring the energy of a recoil proton produced by the first n-p scatter;
calculating an event circle for the given incident neutron thereby locating and identifying a source of incident neutrons.

4. An imaging detector for locating and identifying a source of incident neutrons comprising:
multiple substantially parallel scintillator bars, each such bar having a first end and a second end and such bars being positioned such that the bars are radially symmetric and all of the scintillator bars have the same diameter;
light sensing means attached to the first end and the second end of each such bar for detecting that an incident neutron produced, and transmitting information about, a first n-p scatter in a first such bar and a second n-p scatter in a second such bar, wherein the first n-p scatter occurs prior to the second n-p scatter;
electronic signal processing means to process the information transmitted from said light sensing means to measure the positions and relative times of the first n-p scatter and the second n-p scatter, and the energy of a recoil proton produced by the first n-p scatter;
and an event circle for the incident neutron.

5. A method of locating and identifying a source of incident gamma rays comprising:
positioning multiple scintillator bars, each with a first end and a second end, so that such bars are substantially parallel wherein such bars are radially symmetric and all of the scintillator bars have the same diameter;
attaching a light sensing means to the first end and to the second end of each such bar;
detecting, for each of a series of incident gamma rays, that a given incident gamma ray produced a first Compton interaction in a first such bar;
detecting, for each of the series of incident gamma rays, that the given incident gamma ray produced a second Compton interaction in a second such bar, wherein the first Compton interaction occurs prior to the second Compton interaction;
measuring the positions and relative times of the first Compton interaction and the second Compton interaction;
measuring the energy of a recoil electron produced by the first Compton interaction; and
calculating an event circle for the given incident gamma ray thereby locating and identifying a source of incident gamma rays.

6. The method of locating and identifying a source of incident gamma rays of claim 5, further comprising the step of identifying through scattering kinematics the source as a point source of incident gamma rays.

7. A method of locating and identifying a source of incident gamma rays comprising:
providing a detector, the detector comprising multiple scintillator bars, each with a first end and a second end, so that such bars are substantially parallel wherein such bars are radially symmetric and all of the scintillator bars have the same diameter;
measuring, for each of a series of incident gamma rays, the energy of a given incident gamma ray;
detecting that the given incident gamma ray produced a first Compton interaction in a first bar and a second Compton interaction in a second bar, wherein the first Compton interaction occurs prior to the second Compton interaction;
measuring the energy of a recoil electron produced by the first Compton interaction; and
calculating an event circle for the given incident gamma ray thereby locating and identifying a source of incident gamma rays.

8. An imaging detector for locating and identifying a source of incident gamma rays comprising:
multiple substantially parallel scintillator bars, each such bar having a first end and a second end and such bars being positioned such that the bars are radially symmetric and all of the scintillator bars have the same diameter;
light sensing means attached to the first end and the second end of each such bar for detecting that an incident gamma ray produced, and transmit information about, a first Compton interaction in a first such bar and a second Compton interaction in a second such bar, wherein the first Compton interaction occurs prior to the second Compton interaction; and
electronic signal processing means to process the information transmitted from said light sensing means to measure the positions and relative times of the first Compton interaction and the second Compton interaction, the energy of a recoil electron produced by the first Compton interaction; and an event circle for the incident gamma ray.

* * * * *